(12) United States Patent
Thirunavukkarasu et al.

(10) Patent No.: US 11,481,830 B2
(45) Date of Patent: Oct. 25, 2022

(54) METHOD, SYSTEM AND MEDIUM FOR USER SPECIFIC APPAREL ATTRIBUTE RECOMMENDATION

(71) Applicant: Tata Consultancy Services Limited, Mumbai (IN)

(72) Inventors: Jeisobers Thirunavukkarasu, Chennai (IN); Shilpa Yadukumar Rao, Chennai (IN); Deepa Jayaveer, Chennai (IN); Pranoy Hari, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 126 days.

(21) Appl. No.: 16/833,524

(22) Filed: Mar. 28, 2020

(65) Prior Publication Data

US 2021/0192597 A1 Jun. 24, 2021

(30) Foreign Application Priority Data

Dec. 18, 2019 (IN) .............................. 201921052709

(51) Int. Cl.
*G06Q 30/06* (2012.01)
*G06F 16/9535* (2019.01)
*G06Q 30/02* (2012.01)

(52) U.S. Cl.
CPC ..... *G06Q 30/0631* (2013.01); *G06F 16/9535* (2019.01); *G06Q 30/0201* (2013.01)

(58) Field of Classification Search
CPC ........... G06Q 30/0631; G06Q 30/0201; G06Q 30/0601–0645; G06N 20/00; G06N 5/04; G06F 16/9535

(Continued)

(56) References Cited

U.S. PATENT DOCUMENTS 9,710,841 B2 7/2017 Ainsworth, III et al.
2011/0082764 A1* 4/2011 Flusser .............. G06Q 30/0631
705/26.7

(Continued)

OTHER PUBLICATIONS

Ayn de Jesus, Artificial Intelligence for Clothing and Apparel—Current Applications, Emerj, May 17, 2019 (Year: 2019).*

*Primary Examiner* — Marissa Thein
*Assistant Examiner* — Anna Mae Mitros
(74) *Attorney, Agent, or Firm* — Finnegan, Henderson, Farabow, Garrett & Dunner LLP

(57) ABSTRACT

In online apparel shopping, user finds difficulty in choosing apparel of his/her preferences. This disclosure relates to recommend an apparel specific to a user by estimated attribute values in digital environment. An information associated with the user and apparels is processed to obtain a first parameter and a second parameter and associated data independent matrix and data dependent matrix is derived. The data independent matrix and the data dependent matrix is learned to obtain trained multivariate multi structure model. A significant pattern associated with each user is determined by extracting plurality of images. The derived significant pattern is deployed on k-nearest neighbor model to obtain recommended pattern. The trained multivariate multi structure model and the recommended pattern is applied on state of the user in a real time to estimate the attribute values. The estimated attribute values is mapped with existing apparels in repository to recommend prioritized apparels.

8 Claims, 6 Drawing Sheets

(58) Field of Classification Search
USPC .................................... 705/26.1–27.2, 26.7
See application file for complete search history.

(56) References Cited

U.S. PATENT DOCUMENTS

| | | |
|---|---|---|
| 2016/0092956 A1* | 3/2016 | Su .................... G06Q 30/0643 |
| | | 705/26.5 |
| 2016/0210602 A1 | 7/2016 | Siddique et al. |
| 2017/0091844 A1* | 3/2017 | Yarvis ................ G06Q 30/0631 |
| 2017/0236185 A1* | 8/2017 | Dalal ................. G06Q 30/0643 |
| | | 705/26.7 |
| 2019/0034995 A1 | 1/2019 | Dong |
| 2020/0019811 A1* | 1/2020 | Kim ..................... G06K 9/6262 |
| 2020/0104633 A1* | 4/2020 | Zheng ................ G06Q 30/0627 |

* cited by examiner

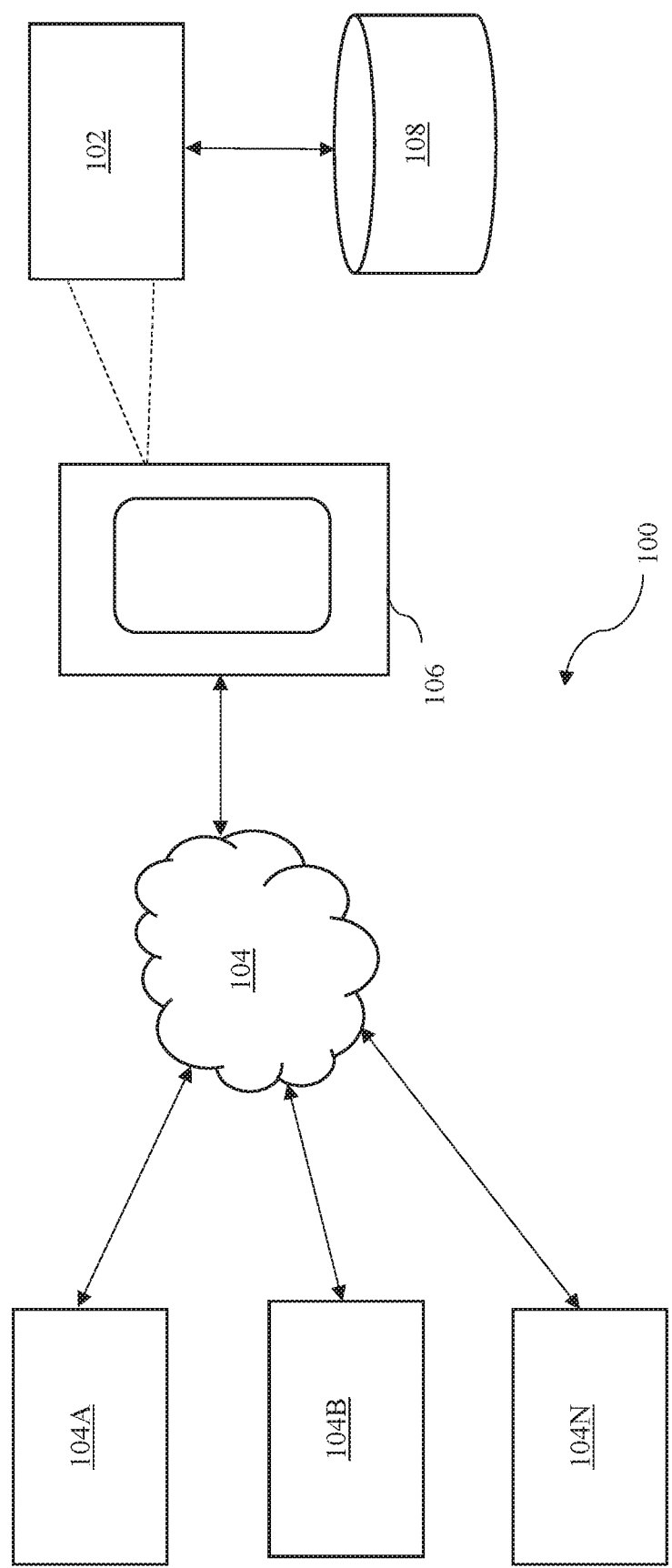

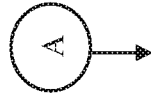

learning, by a multivariate multi structure model, (i) the data independent matrix and the data dependent matrix associated with the first parameter, and (ii) the data independent matrix and the data dependent matrix associated with the second parameter to obtain a trained multivariate multi structure model 408 determining, a significant pattern associated with each user by extracting a plurality of images from the information associated with the user and the plurality of apparels based on a data reduction techniques, wherein the significant pattern corresponds to a third parameter 410 deploying, the significant pattern associated with the each user on a k-nearest neighbor (k-NN) model to obtain a recommended pattern 412

FIG. 4B

METHOD, SYSTEM AND MEDIUM FOR USER SPECIFIC APPAREL ATTRIBUTE RECOMMENDATION

PRIORITY CLAIM

This U.S. patent application claims priority under 35 U.S.C. § 119 to: India Application No. 201921052709, filed on Dec. 18, 2019.

TECHNICAL FIELD

This disclosure relates generally to recommendation system, and, more particularly, to system and method for user specific apparel attribute recommendation.

BACKGROUND

Online shopping has observed a major growth in recent years in retail due to digital transformation. However, due to the fact that customers are not having confidence on fitness of item purchased through online. Fitting problem in the apparel is largely related with customer, apparel and manufacturer. Each customer is unique in their body shape and so unique in their body measurements which makes the fitting problem as more complex and which needs to be addressed at individual customer level. Traditionally, the same is addressed by looking the body size as small, medium, large and extra-large, etc. In addition, different manufactures have different sizes with different fitness. Availability of body measurements for different body parts for every customer is challenging and in addition it varies across customers in terms of available measures.

The difference between the actual body measurements and the apparel measurements is indicated in terms of 'ease'. Any apparel that is of the right size and neither too loose nor too tight is said to have good ease. An apparel that fits without any wrinkles or strain is said to have optimum ease. Ease varies with customer profile, type of apparel, fabric of apparel, and weather conditions. Customer preferences with respect to fitting varies based on type of apparel as each apparel is considered differently by the customer. Casual dress may require extra size as compared to formal dress for the same customer. Similarly cotton material may require extra size as compared to nylon material. Older age group may require extra size as compared to younger age group. Summer session may require extra size as compared to winter session. Younger age group grow faster and it gives new dimension to the issue. Similarly, those people who are following weight loss or weight gain programs needs apparels with varying fitting nature so that the fitting problem could be addressed in long run.

Color preference of the young age group varies as compared to the old age group. Female color preference vary as compared to male for identical apparel. Profession of the customer has a role in selection of color. Color preferences of black people varies as compared to Hispanic people. In addition to customer profile, color preference varies based on the type of apparel and pattern of the apparel individually as well as in combination with other factors. For example, a customer may prefer light green for a top when it is for a particular pattern and she may prefer dark green when the same customer goes for another pattern. Similarly, she may go for light colors with 'v' neck and dark colors for tops if it has round neck. By this way color preferences are affected by many factors individually and combined with other factors as well. Similar to color, the customer preferences with respect to pattern varies based on customer profile such as age, gender, ethnicity and profession etc.

SUMMARY

Embodiments of the present disclosure present technological improvements as solutions to one or more of the above-mentioned technical problems recognized by the inventors in conventional systems. For example, in one aspect, a processor implemented method of recommending an apparel specific to a user by a plurality of estimated attribute values in a digital environment is provided. The processor implemented method includes at least one of: receiving, via one or more hardware processors, an information associated with the user and a plurality of apparels; processing, via the one or more hardware processors, the information associated with the user and the plurality of apparels to obtain at least one of: (i) a first parameter, and (ii) a second parameter; deriving, via the one or more hardware processors, a data independent matrix and a data dependent matrix for at least one of: (i) the first parameter, and (ii) the second parameter; learning, via the one or more hardware processors, by a multivariate multi structure model, (i) the data independent matrix and the data dependent matrix associated with the first parameter, and (ii) the data independent matrix and the data dependent matrix associated with the second parameter to obtain a trained multivariate multi structure model; determining, via the one or more hardware processors, a significant pattern associated with each user by extracting a plurality of images from the information associated with the user and the plurality of apparels based on a data reduction techniques; and deploying, via the one or more hardware processors, the significant pattern associated with the each user on a k-nearest neighbor (k-NN) model to obtain a recommended pattern. In an embodiment, the significant pattern corresponds to a third parameter.

The processor implemented method may further include: (a) estimating, via the one or more hardware processors, a plurality of attribute values by applying (i) the trained multivariate multi structure model, and (ii) the recommended pattern, on a state of the user in a real time; and (b) mapping, via the one or more hardware processors, the plurality of attribute values with existing apparels in a repository to recommend plurality of prioritized apparels to the user. In an embodiment, the information associated with the user and the plurality of apparels may include at least one of: (i) historical data related with online purchase and return information, (ii) a user profile, (iii) multiple body measurements of the user, (iv) apparel master data, and (v) weather information. In an embodiment, the first parameter may correspond to a plurality of body dimensions of the user. In an embodiment, combined structure of the dependent matrix and the independent matrix of the first parameter may be considered to determine a variation of apparel multiple measurements based on at least one of (i) body measurements of the user, (ii) the user profile, (iii) physical activities of the user, (iv) food habits of the user, (v) and an apparel type. In an embodiment, the second parameter may correspond to a plurality of color preferences of the user and an apparel. In an embodiment, combined structure of the dependent matrix and the independent matrix of the second parameter may be considered to determine a variation in behavior of color preference based on at least one of (i) the user profile, (ii) the apparel type, and (iii) the apparel size. In an embodiment, the plurality of attribute values may correspond to at least one of: (i) an ideal multiple measurements of an apparel, (ii) an ideal color of an apparel, and (iii) an ideal pattern of an apparel. The processor implemented method may further include: (a) learning, via the one or more hardware processors, primary relationship between a plurality of missed body measurements and a plurality of available body measurements associated with a set of users by the trained multivariate multi structure model to obtain a specific set of missed body measurements, and (b) estimating, via the one or more hardware processors, an error associated with the specific set of missed body measurements.

In another aspect, there is provided a user specific apparel recommendation system for recommendation of an apparel specific to a user by a plurality of estimated attribute values in a digital environment. The system comprises a memory storing instructions; one or more communication interfaces; and one or more hardware processors coupled to the memory via the one or more communication interfaces, wherein the one or more hardware processors are configured by the instructions to: receive, an information associated with the user and a plurality of apparels; process, the information associated with the user and the plurality of apparels to obtain at least one of: (i) a first parameter, and (ii) a second parameter; derive, a data independent matrix and a data dependent matrix for at least one of: (i) the first parameter, and (ii) the second parameter; learn, by a multivariate multi structure model, (i) the data independent matrix and the data dependent matrix associated with the first parameter, and (ii) the data independent matrix and the data dependent matrix associated with the second parameter to obtain a trained multivariate multi structure model; determine, a significant pattern associated with each user by extracting a plurality of images from the information associated with the user and the plurality of apparels based on a data reduction techniques; and deploy, the significant pattern associated with the each user on a k-nearest neighbor (k-NN) model to obtain a recommended pattern. In an embodiment, the significant pattern corresponds to a third parameter.

The one or more hardware processors are configured by the instructions to: (a) estimate, a plurality of attribute values by applying (i) the trained multivariate multi structure model, and (ii) the recommended pattern, on a state of the user in a real time; and (b) map, the plurality of attribute values with existing apparels in a repository to recommend plurality of prioritized apparels to the user. In an embodiment, the information associated with the user and the plurality of apparels may include at least one of: (i) historical data related with online purchase and return information, (ii) a user profile, (iii) multiple body measurements of the user, (iv) apparel master data, and (v) weather information. In an embodiment, the first parameter may correspond to a plurality of body dimensions of the user. In an embodiment, combined structure of the dependent matrix and the independent matrix of the first parameter may be considered to determine a variation of apparel multiple measurements based on at least one of (i) body measurements of the user, (ii) the user profile, (iii) physical activities of the user, (iv) food habits of the user, (v) and an apparel type. In an embodiment, the second parameter may correspond to a plurality of color preferences of the user and an apparel. In an embodiment, combined structure of the dependent matrix and the independent matrix of the second parameter may be considered to determine a variation in behavior of color preference based on at least one of (i) the user profile, (ii) the apparel type, and (iii) the apparel size. In an embodiment, the plurality of attribute values may correspond to at least one of: (i) an ideal multiple measurements of an apparel, (ii) an ideal color of an apparel, and (iii) an ideal pattern of an apparel. The one or more hardware processors are configured by the instructions to: (a) learn, primary relationship between a plurality of missed body measurements and a plurality of available body measurements associated with a set of users by the trained multivariate multi structure model to obtain a specific set of missed body measurements, and (b) estimate, an error associated with the specific set of missed body measurements.

In yet another aspect, there are provided one or more non-transitory machine readable information storage mediums comprising one or more instructions which when executed by one or more hardware processors causes at least one of: receiving, via one or more hardware processors, an information associated with the user and a plurality of apparels; processing, via the one or more hardware processors, the information associated with the user and the plurality of apparels to obtain at least one of: (i) a first parameter, and (ii) a second parameter; deriving, via the one or more hardware processors, a data independent matrix and a data dependent matrix for at least one of: (i) the first parameter, and (ii) the second parameter; learning, via the one or more hardware processors, by a multivariate multi structure model, (i) the data independent matrix and the data dependent matrix associated with the first parameter, and (ii) the data independent matrix and the data dependent matrix associated with the second parameter to obtain a trained multivariate multi structure model; determining, via the one or more hardware processors, a significant pattern associated with each user by extracting a plurality of images from the information associated with the user and the plurality of apparels based on a data reduction techniques; and deploying, via the one or more hardware processors, the significant pattern associated with the each user on a k-nearest neighbor (k-NN) model to obtain a recommended pattern. In an embodiment, the significant pattern corresponds to a third parameter.

The one or more hardware processors are configured by the instructions to: (a) estimate, a plurality of attribute values by applying (i) the trained multivariate multi structure model, and (ii) the recommended pattern, on a state of the user in a real time; and (b) map, the plurality of attribute values with existing apparels in a repository to recommend plurality of prioritized apparels to the user. In an embodiment, the information associated with the user and the plurality of apparels may include at least one of: (i) historical data related with online purchase and return information, (ii) a user profile, (iii) multiple body measurements of the user, (iv) apparel master data, and (v) weather information. In an embodiment, the first parameter may correspond to a plurality of body dimensions of the user. In an embodiment, combined structure of the dependent matrix and the independent matrix of the first parameter may be considered to determine a variation of apparel multiple measurements based on at least one of (i) body measurements of the user, (ii) the user profile, (iii) physical activities of the user, (iv) food habits of the user, (v) and an apparel type. In an embodiment, the second parameter may correspond to a plurality of color preferences of the user and an apparel. In an embodiment, combined structure of the dependent matrix and the independent matrix of the second parameter may be considered to determine a variation in behavior of color preference based on at least one of (i) the user profile, (ii) the apparel type, and (iii) the apparel size. In an embodiment, the plurality of attribute values may correspond to at least one of: (i) an ideal multiple measurements of an apparel, (ii)

an ideal color of an apparel, and (iii) an ideal pattern of an apparel. The one or more hardware processors are configured by the instructions to: (a) learn, primary relationship between a plurality of missed body measurements and a plurality of available body measurements associated with a set of users by the trained multivariate multi structure model to obtain a specific set of missed body measurements, and (b) estimate, an error associated with the specific set of missed body measurements.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates a network implementation of a system for recommendation of an apparel specific to a user by a plurality of estimated attribute values in a digital environment, according to an embodiment of the present disclosure.

FIGS. 4A and 4B is an exemplary flow diagrams illustrating method of recommending the apparel specific to the user by the plurality of estimated attribute values in the digital environment, according to some embodiments of the present disclosure.

DETAILED DESCRIPTION

Figure 2A:
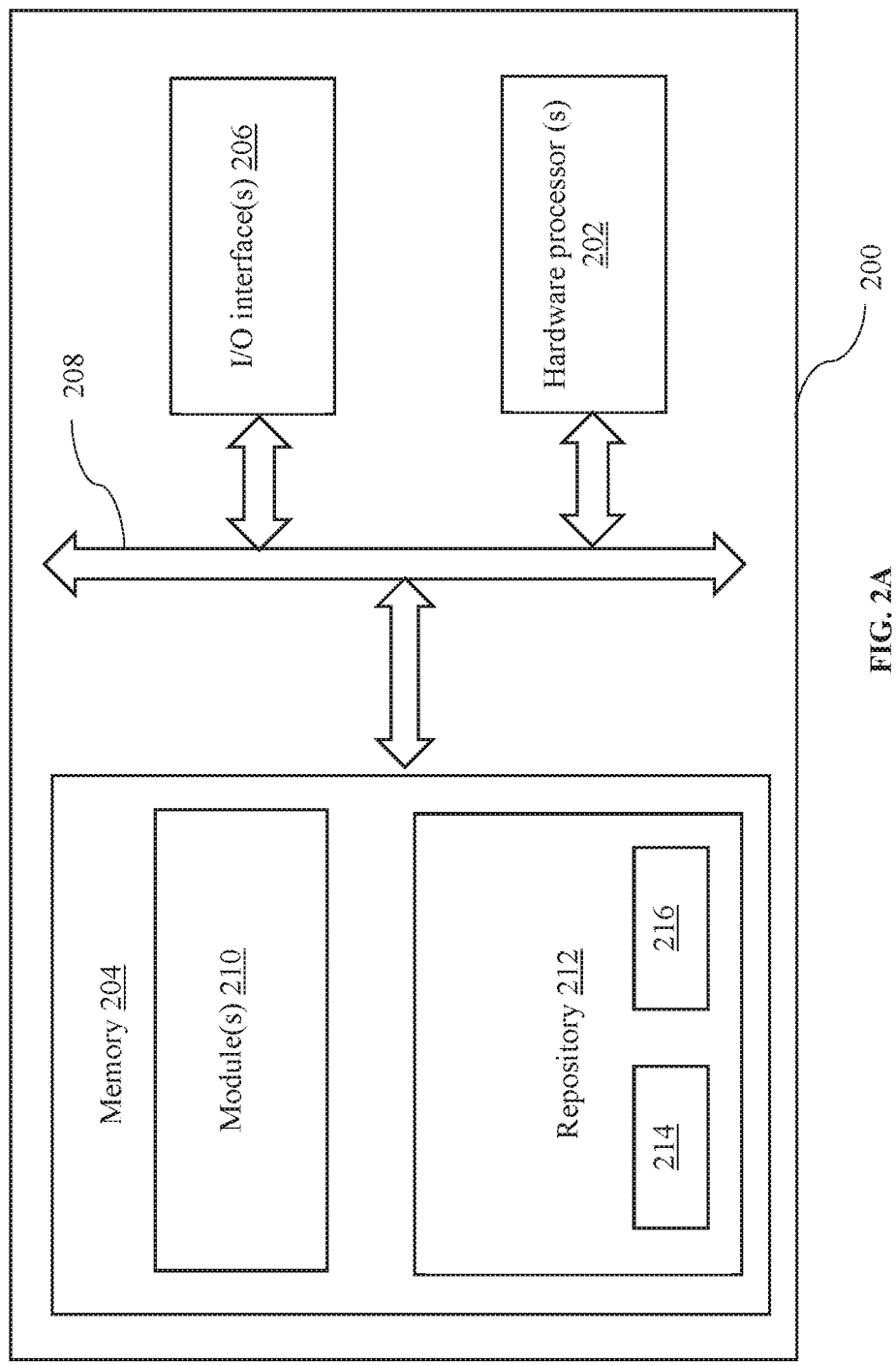
FIG. 2A illustrates a block diagram of the system for recommendation of the apparel specific to the user by the plurality of estimated attribute values in the digital environment, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 1 through 4B, where similar reference characters denote corresponding features consistently throughout the figures, there are shown preferred embodiments and these embodiments are described in the context of the following exemplary system and/or method.

FIG. 1 illustrates a network implementation 100 of a system 102 for recommendation of an apparel specific to a user by a plurality of estimated attribute values in a digital environment, according to an embodiment of the present disclosure. The system is adapted to recommend an apparel specific to a user by a plurality of estimated attribute values in a digital environment. Although the present subject matter is explained considering that the system 102 is implemented for recommending an apparel specific to the user by the plurality of estimated attribute values in the digital environment, and may be understood that the system 102 may not be restricted to any particular machine or environment. In an embodiment, the system 102 are implemented in a variety of computing systems, such as laptop computers, notebooks, hand-held devices, workstations, mainframe computers, servers, a network cloud, a smart phone, a wearable device, and the like.

Herein, the system 102 may acquire an input data for recommending an apparel specific to the user via one or more user devices 104-A, 104-B . . . 104-N, collectively referred to as devices 104 hereinafter. In an embodiment, the user devices 104 may be embodied in handheld electronic device, a mobile phone, a smartphone, a portable computer, a PDA, and so on. The user devices 104 are communicatively coupled to the system 102 through a network 104 and may be capable of providing input data to the system 102.

In one implementation, the network 104 may be a wireless network, a wired network or a combination thereof. The network 104 can be implemented as one of the different types of networks, such as intranet, local area network (LAN), wide area network (WAN), the internet, and the like. The network 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 104 may include a variety of network devices, including routers, bridges, servers, computing devices, storage devices, and the like.

In an embodiment, the system 102 may be embodied in the computing device 106. The system 102 may also be associated with a data repository 108 to store at least data required to estimate a plurality of attribute values. Additionally, or alternatively, the data repository 108 may be configured to store data and/or information generated during recommending an apparel specific to a user and the plurality of estimated attribute values. The data repository 108 may be configured outside and communicably coupled to the computing device 106 embodying the system 102. Alternatively, the data repository 108 may be configured within the system 102. An example implementation of the system 102 for recommending an apparel specific to a user by a plurality of estimated attribute values in the environment is described further with reference to FIG. 2B.

FIG. 2A illustrates a block diagram of a system for recommendation of an apparel specific to a user by a plurality of estimated attribute values in a digital environment, according to an embodiment of the present disclosure. The system 200 may be an example of the system 102 (FIG. 2A). In an example embodiment, the system 200 may be embodied in, or is in direct communication with the system, for example the system 102 (FIG. 2A). In an embodiment, the system 200 includes one or more processors 202, communication interface device(s) or input/output (I/O) interface(s) 206, and one or more data storage devices or memory 204 operatively coupled to the one or more processors 202. The memory 204 comprises a database. The processor 202, memory 204, and the I/O interface 206 may be coupled by a system bus such as a system bus 208 or a similar mechanism. The one or more processors 204 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory 204.

The I/O interface device(s) 206 can include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) can include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 210 and a repository 212 for storing data processed, received, and generated by the plurality of modules 210. The plurality of modules 210 may include routines, programs, objects, components, data structures, and so on, which perform particular tasks or implement particular abstract data types.

Additionally, the other modules 210 may include programs or coded instructions that supplement applications and functions of the system 200. The repository 212, amongst other things, includes a system database 214 and other data 216. The other data 216 may include data generated as a result of the execution of one or more modules in the module (s) 210. Herein, the memory for example the memory 204 and the computer program code configured to, with the hardware processor for example the processor 202, causes the system 200 to perform various functions described herein under. The system database 214 store information associated with one or more users and apparels which include plurality of associated parameters.

Figure 2B:
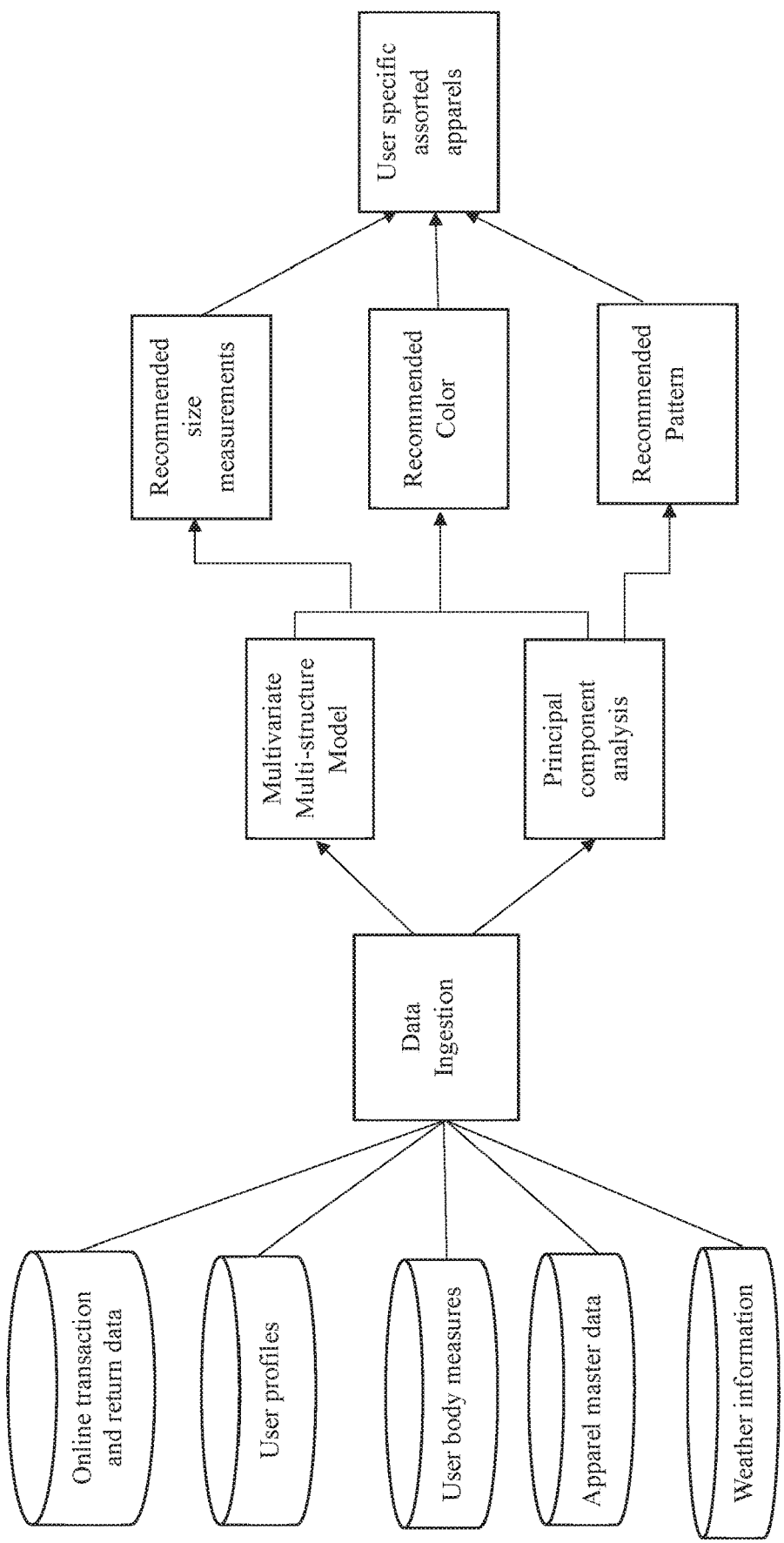
FIG. 2B illustrates an exemplary block diagram of a user specific apparel recommendation system for recommendation of the apparel specific to the user by the plurality of estimated attribute values in the digital environment, according to an embodiment of the present disclosure.

FIG. 2B illustrates an exemplary block diagram of the user specific apparel recommendation system 200 for recommendation of the apparel specific to the user by the plurality of estimated attribute values in the digital environment, according to an embodiment of the present disclosure. The user specific apparel recommendation system 200 is configured to receive information associated with one or more users and one or more apparels. In an embodiment, the one or more information corresponds to (i) historical data related with online purchase and return information, (ii) user profile, (iii) multiple body measurements of the user, (iv) apparel master data, and (v) weather information.

The one or more processed information is processed to obtain one or more: (i) a first parameter, (ii) a second parameter, and (iii) a third parameter. In an embodiment, the first parameter corresponds to a plurality of body dimensions. In an embodiment, the second parameter corresponds to plurality of color preferences. In an embodiment, the third parameter correspond to a significant pattern. For example, the significant pattern is determined by extracting a plurality of images from the apparel based on a data reduction techniques. For example, the significant pattern corresponds to a checkered pattern shirt with even sized checks, striped shirts with pattern formed by horizontal and vertical stripes.

The user specific apparel recommendation system 200 is configured to derive a data independent matrix and a data dependent matrix for one or more (i) the first parameter, (ii) the second parameter. A combined structure of the dependent matrix and the independent matrix of the first parameter is to determine a variation of apparel multiple measurements based on (i) body measurements of the user, (ii) the user profile, (iii) physical activities of the user, (iv) food habits of the user, (v) and an apparel type. A combined structure of the dependent matrix and the independent matrix of the second parameter is to determine a variation in behavior of color preference based on (i) the user profile, (ii) the apparel type, and (iii) the apparel size.

The data independent matrix and the data dependent matrix associated with the first parameter and the second parameter, is learned by a multivariate multi structure model. In an embodiment, a plurality of attribute values is estimated by applying the trained multivariate multi structure model and estimated recommended pattern, on a state of the user in a real time. In an embodiment, the state of the user in real time correspond to but not limited to at least one of (i) the user performing a search of an apparel at online database, and (ii) the user is intended to purchase an apparel.

In another embodiment, the trained multivariate multi structure model and the state of the user in the real time to estimate a growth factor and dynamically recommend an ideal apparel. The plurality of attribute values are mapped with existing apparels in a repository to recommend plurality of prioritized apparels to the user. In an embodiment, the plurality of attribute values corresponds to at least one of: (i) an ideal measurements of an apparel, (ii) an ideal color of an apparel, and (iii) an ideal pattern of an apparel.

Figure 3:
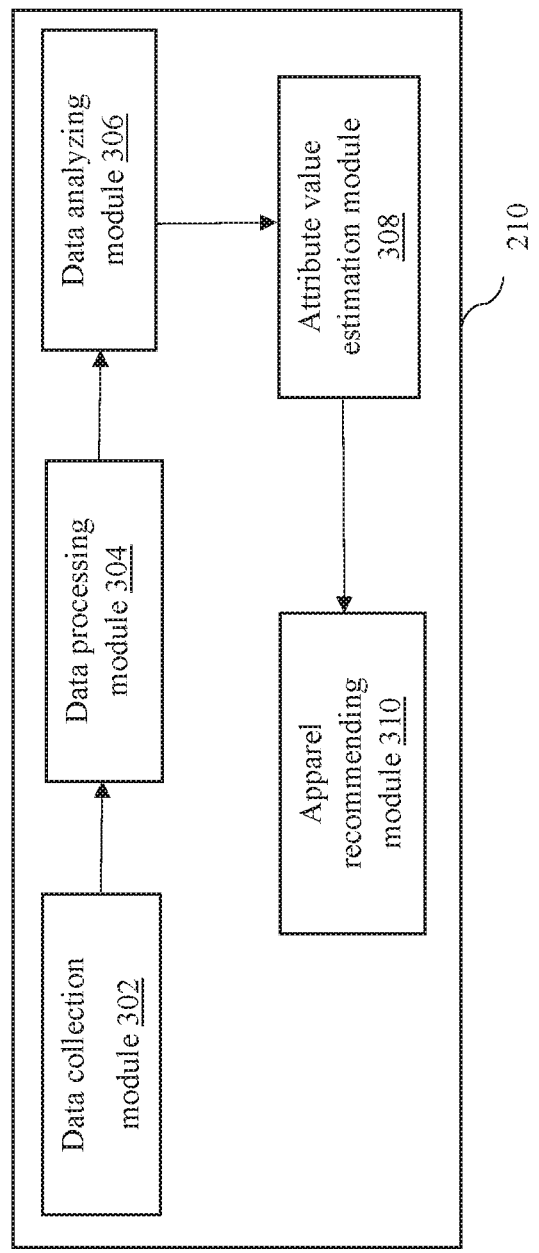
FIG. 3 is a functional block diagram of module (s) of the user specific apparel recommendation system, according to some embodiments of the present disclosure.

FIG. 3 is a functional block diagram of module (s) 210 of the user specific apparel recommendation system 200, according to some embodiments of the present disclosure. The module (s) 210 of the user specific apparel recommendation system 200 includes a data collection module 302, a data processing module 304, a data analyzing module 306, an attribute value estimation module 308, and an apparel recommending module 310. The data collection module 302 is configured to collect information from different data sources such as online purchase and return information, customer relation management (CRM), an apparel master data, and weather information. The CRM captures information related with user profiles such as age, gender, body weight, height, hip size, neck size, and other required available measurements, profession, income group, etc., body weight and body measurements in different dimensions. In an embodiment, from online point of sale (POS), one or more transactions i.e., one or more purchased products with no return history are considered for further processing. For example, the purchased products (apparels) are returned based on suitability i.e. a size, a color and a pattern. The apparel master data have detailed apparel size measurements in different dimensions, material type (e.g., cotton, polyester, and the like), other attributes and images, weight such as light, heavy, etc. In an embodiment, the weather information received from third party vendors have information related with daily temperature, humidity and precipitation etc.

The data processing module 304 is configured to process one or more parameters associated with the user and the apparels. In an embodiment, the one or more parameters of the user and the apparel are the first parameter, the second parameter, and the third parameter. For example, the first parameter corresponds to size associated with the user and the apparel, the second parameter corresponds to color associated with the user and the apparel, and similarly the third parameter corresponds to pattern associated with the apparel.

The data processing module 304 is configured to process the first parameter in which an independent data matrix is structured to capture body measurements of the user and other factors that decide the apparel size at each online purchases. Similarly, a dependent data matrix, which is structured to capture apparel measurements in different dimensions representing different parts of apparel. In an embodiment, the independent data matrix includes columns and rows. In an embodiment, column of the independent matrix includes one or more factors that decides apparel size such as customer body measurements in multiple dimensions, user profiles, weight of user, apparel details, and weather conditions. In an embodiment, user body measurements known as anthropometrical measurements which corresponds to capture body shape at granular level and include e.g., more than 100 measurements for each user. The user profiles that decide apparel size are age, gender, ethnicity, level of sports activities, food habits, and profession etc.

In an embodiment, the apparel details include one or more variables such as type, material, pattern and manufacturer of apparel. In an embodiment, temperature at the time of transactions is captured and represent weather conditions. Each row of the independent matrix includes the information of individual transaction level of every user and all the transactions of historical users which decide number of rows of the independent matrix. For example, from online point of sale (POS), one or more transactions i.e., one or more purchased apparel with no return history are considered for further processing. The dependent matrix facilitates to capture measurements of apparel in multiple dimensions and include e.g., more than hundred measurements for each apparel. In an embodiment, a combined structure of the dependent and the independent matrix facilitates to establish variation of apparel multiple measurements that arise due to body measurements of user, the user profiles, apparel details and weather conditions, etc. In an embodiment, a mechanism of 'ease' is learned which varies based on user profiles, apparel details and weather conditions.

The data processing module 304 is configured to process the second parameter in which an independent data matrix is structured to capture factors that decide a color of the apparel at each online purchases. Similarly, a dependent data matrix, which is structured to capture apparel color in the form of suitable color coding. In an exemplary embodiment, assuming that the values of color coding derived from the plurality of image using different processing methods followed in emerging research areas are uniformly distributed in a color space and to represent different colors by a human perception. In an embodiment, each image is processed, and a color histogram is created and mode of each color histogram is found and noted. Accordingly, each image includes three modes that represent a suitable color system.

In an embodiment, dependent matrix is formed using the multiple values provided by the color coding or values modified by using suitable technique which is uniformly distributed to represent different colors by human perception. The independent data matrix includes columns and rows. Each column includes one or more factors that decides color of an apparel such as customer profiles, apparel type and apparel pattern. Similarly, each row includes the information at individual transaction level of every customer. A combined structure of the dependent and the independent matrix facilitates to establish the behavior of color preference variation that arise due to customer profiles, apparel type and apparel size, etc.

The data processing module 304 is configured to process the third parameter in which one or more images of the apparels purchased by the user through online and brick and mortar stores are received from the data collection module 302. The received image is converted into a numeric value using suitable techniques. In an embodiment, image is transformed into a vector of length $N=mn$. Each row of an image is segregated and added one by one to form a single vector. Accordingly, if an image includes 'm' rows and 'n' columns and then the vector includes 'm' observations. For example, considering if the user includes 'M' images then M vectors are used to form a matrix. Each column of matrix represents an image and number of columns of matrix is equal to number of images. In an embodiment, standardization is carried out by subtracting the individual image value with mean image values i.e., each image vector is subtracted from the vector of mean value.

The vector of mean value is calculated by considering all the images for every pixel. In an embodiment, the standardized matrix includes 'M' columns and 'N' rows. The standardized matrix is sent for principle component analysis (PCA) and Eigen vectors and Eigen values are calculated. In one embodiment, the Eigenvector associated with highest eigenvalue reflects highest variance, and one associated with lowest eigenvalue, smallest variance. In one embodiment, each vector is representing a pattern and the eigenvector with the highest variance represent the top pattern associated with the user profile. Eigenvalues decrease exponentially and top vector representing top pattern is selected.

The data analyzing module 306 is configured to provide top pattern associated with each user. The user profiles such as age, gender, profession, ethnicity, etc., are mapped with the top pattern. In an embodiment, procedure of finding pattern and mapping with user profiles enables to establish relationship between one or more user profiles and the top pattern preferences.

The data analyzing module 306 is configured to analyze the processed first parameter i.e. the body measurement of the user, by using machine learning models. In an embodiment, an optimal model is developed by repeated iterations using the multivariate multi structure machine learning models. The independent data matrix and the dependent data matrix is passed into the machine learning models. In an embodiment, the multivariate multi-structure machine learning models are developed using random forest technique which is an ensemble learning method for regression. In an embodiment, there are provision in open source software to consider multi-columns as dependent variable and independent matrix as causative factors.

In one example, an open source software namely R software has package called Random Forest SRC. The package include provision to consider multivariate matrix as a dependent variable and an independent matrix as causative factors. The machine learning models relate the independent data matrix with the dependent data matrix. In an embodiment, simultaneous consideration of measurements of body in multiple dimensions, user profiles and other factors are mapped with measurements of apparel in multiple dimensions through machine learning models. This set up trains fitting behavior that exist in the passing information. The dependent and the independent matrix set up facilitates to capture interaction effect that occurs between apparel type, apparel pattern and the user profile and arise in the user mindset at the time of ordering. The success of training depends on the period of data used for learning and ideally needs to be as long as possible and should capture all possible scenarios that exist in real retail scenarios.

In an embodiment, in the multivariate multi structure, apparels individual size measurements act as target matrix and other variables such as user body measurements, user profiles, material nature and weight and weather act as an independent matrix. In an embodiment, learning phase is carried out by using the developed model based on latest historical data and the model is capable of predicting optimal size parameters but not limited to such as a chest width, a height, and bottom width.

The data analyzing module 306 is configured to analyze the processed second parameter i.e. the color, by using machine learning models. In an embodiment, an optimal model is developed by repeated iterations using the multivariate multi structure machine learning models. The independent data matrix and dependent data matrix is passed into the machine learning models. The independent data matrix captures factors that decide color of the apparel at each online purchases and the dependent data matrix captures apparel color in form of suitable color coding. In an embodiment, the multivariate multi-structure machine learning models are developed using a random forest technique. The machine learning models relate the independent data matrix with the dependent data matrix. For example, simultaneous consideration of the user profiles and other factors are mapped with values of color of apparel which helps in training behavior of color selection that exist in the passing information. The variables such as the user profile and apparel type act as independent matrix. The model utilizes past historical transaction of customers and associated profiles to understand the behavior. In an embodiment, learning phase is carried out by using the developed model with latest historical data and learnt model is ready to predict the color based on user profile.

The data analyzing module 306 is configured to analyze the processed third parameter i.e. the pattern, by using machine learning models. The data analyzing module 306 is configured to provide top pattern associated with each user. The user profiles such as age, gender, profession, ethnicity, etc., are mapped with the top pattern. This procedure of finding top pattern and mapping with user profiles enables to establish relationship between customer profiles and the top pattern preferences.

The attribute value estimation module 308 is configured to estimate attribute value. For example, when a user attempts to login and search within an apparel category with an intension of buying an apparel, required information such as user body measurements, user profiles, apparel type and temperature during login are passed into the trained multivariate multi-structure machine learning model. The trained multivariate multi-structure machine learning model predicts ideal measurements of apparel in multiple dimension and ideal color that suits for the user logged in. In an embodiment, ideal pattern that suits for user logged in is predicted by using KNN (k-nearest neighbors) model at real time under specific values of the user profile, apparel type and apparel size.

The apparel recommending module 310 is configured to recommend a set of apparels which are specific to the user. For example, when a user attempts to login and search within an apparel category, the predicted values are mapped with apparel parameters available with a retailer. In an embodiment, while manufacturing, every manufacturer provides individual measures for each part of apparel and a single measure called as "size" (e.g., for 'size' are small, medium, large, extra-large) as a representative of set of individual measures. Each 'size' includes detailed individual measures representing each part of apparel. For example, 'size' namely 'small' include a set of individual measures representing each part of apparel.

The estimated ideal body measures from the trained multivariate multi structure model are compared with set of individual measures corresponding to 'size' such as small, large, etc., and multivariate distance is calculated. The set of individual measures with shortest multivariate distance is selected, in other words the 'size' with set of individual measures that are very closer to estimated ideal body measures is selected.

In an embodiment, apparels are ordered based on the similarity of apparel size measurements. Similarity is measured based on multivariate distance e.g., the multivariate distance are Euclidean distance, Mahalanobis distance, etc. Similarly, the predicted values of color the trained multivariate multi structure model are mapped with values of color of each apparel images and their similarity is calculated. In an embodiment, apparels are ordered based on similarity measure based on the color coding values. The predicted top pattern in form of the vector is checked with existing pattern of each apparel image in form of the vector and their similarity is calculated. In an embodiment, apparels are ordered based on similarity measure based on pattern. Finally, the closeness of each apparel with at least one of (i) predicted ideal apparel size measurements, (ii) predicted values of the color coding, (iii) predicted pattern are arrived individually and also combined.

Based on combined closeness, ranking is found for each apparel and the apparels with top ranks are displayed in order of associated ranks. In an embodiment, if the user wants to provide importance to certain measurements then weighted multivariate distance is used. For example, if the user wants to give more weightage to a hip size then he/she could give more weights as compared to other apparel size measurements. In an embodiment, the plurality of prioritized apparels are dynamically ranked by providing at least one weight to sub parameters defined by the user. In an embodiment, predicted value of size, color and pattern are mapped with existing apparels of the retailer that are available in inventory. Those apparels which are closer in terms of size type, top color, and top pattern are considered individually for retail strategies such as online display priority and online promotions.

In an exemplary embodiment, an apparel size enabler for retailer and manufacturer from a simulated body shape is achieved. For example, gender, age, ethnicity and level of athletic activities and food habits, etc., and body measurements at multiple dimensions are received from the data collection module 302. Body measurements may be complete or partial based on the information provided by the user. In an embodiment, the user with missing of any one of the body measurements is noted as a test user and the user with complete body measure is noted as trained user. The body measure which is missed is regressed against the factors which facilitate to estimate the missing body measure using one or more machine learning algorithms. The facilitating factors need to be common between the test user and trained user. The facilitating factors are such as the body measurements still available with the test user and user profiles such as gender, age, ethnicity, athletic activity and food habits, etc. The setup enables to estimate one body measure from other body measurements. The estimation is carried out by learning the mechanism between body measurements with one or more facilitating features such as other body measurements, gender, age, ethnicity, athletic activity and food habits. In an embodiment, the machine learning models are trained using latest historical information and used to predict the body measurements that is missing with the test user. In addition, the model enables in estimating one or more possible errors associated with estimated body measurements. The procedure is repeated for each body measure that is missing with the test user and continued until all the body measurements are estimated. Thus the test user have complete body measurements including actual body measurements and estimated body measurements for the missed ones and the possible error associated. Combinations of all the measurements represent the body shape which is unique for a user. In an embodiment, an error associated with a specific set of missed body measurements is estimated. For example, error of an estimated body measure is considered for manufacturing an apparel in such a way that the error is in proportion to presence of elastic material for specific part of an apparel.

The data analyzing module 306 is configured to provide complete set of body measurements such as actual and estimated measurements for the missing ones for each user. In an embodiment, segmentation of body measurements are carried out to find distinct body shapes and outcomes act as directive inputs for assortment and manufacturer. Body measurements of an entity, for example, a male user is selected and the principle component analysis (PCA) is applied for the body measurements data and key components explaining body variations are extracted. In an embodiment, one or more PCA components are used for segmentation to identify major body shapes present in population. The segmentation results provide the distribution of distinct body shapes and associated magnitude and the segmentation result is utilized to decide the assortment to be applied based on body shape. Alternatively, for each body shape how many proportion of units need to be kept by the retailer during assortment as well as how many proportion of units need to be produced during manufacturing stage. In an embodiment, each body shape includes one or more measurements covering each body part. In an embodiment, mean and standard error is calculated for each body measure and carried at group level i.e., for each body shape separately. In an embodiment, the measurements calculated at group level such as mean and standard error is used to strategize apparel manufacturer. For example, the elastic material specific to a particular body part need to be in proportion to the standard error value. The body measure with highest standard error indicates that the body part includes more variation across users and need adjust measurements such as adding elastic material to the specific body part with highest variation. The elastic material specific to a particular body part need to be in proportion to the standard error value.

In another exemplary embodiment, criteria to select robust apparels is derived by considering growth factor or change in a body shape. Relationship between body measurements of user and age, gender, ethnicity, physical activities and food habits is established using machine learning model. The trained model is used to estimate body measurements in multiple dimensions for different assumed ages of the user having specific gender, ethnicity, physical activity and food habits. In an embodiment, growth factor is calculated by using the estimated body measure across different assumed ages. The growth factor is specific to each body measure and corresponding distribution across different body measurements indicates the change in body shape at micro level over few years for the given user. The growth factor is estimated for each body measure and specific for a user with respect to age, gender, ethnicity, physical activity and food habits. The estimated growth factor is used to select apparel with (a) option to consider faster changes in body measurements i.e., with expansion such as inclusion of spandex or provision of elastic strips in required body parts.

In yet another exemplary embodiment, if retailer consider strategy to produce apparel at individual customer level, the predicted ideal measurements of apparel with multiple dimensions could be used to modify existing apparel under a 'tailor to fit' option or stitch new apparel to suit exactly.

Figure 4A:
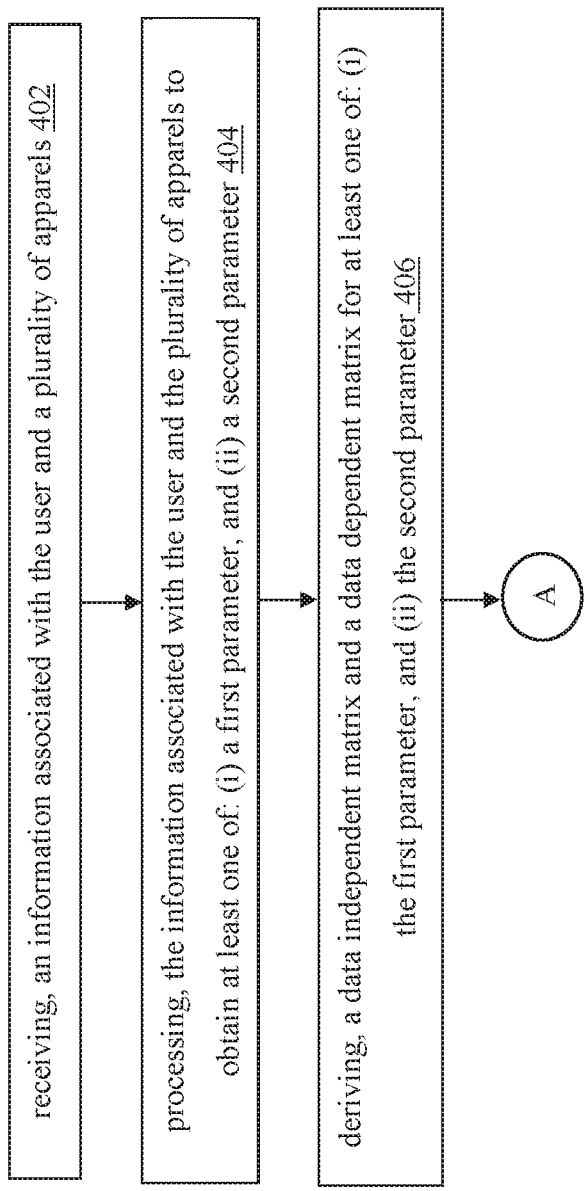

FIGS. 4A and 4B is an exemplary flow diagrams illustrating method of recommending the apparel specific to the user by the plurality of estimated attribute values in the digital environment, according to some embodiments of the present disclosure. In an embodiment, the system 200 comprises one or more data storage devices or the memory 204 operatively coupled to the one or more hardware processors 202 and is configured to store instructions for execution of steps of the method by the one or more processors 202. The flow diagram depicted is better understood by way of following explanation/description. The steps of the method of the present disclosure will now be explained with reference to the components of the system as depicted in FIGS. 2A and 2B.

At step 402, an information associated with the user and a plurality of apparels is received. In an embodiment, the information associated with the user and the plurality of apparels include one or more (i) historical data related with online purchase and return information, (ii) a user profile, (iii) multiple body measurements of the user, (iv) apparel master data, and (v) weather information. At step 404, the information associated with the user and the plurality of apparels is processed to obtain one or more of the following: (i) first parameter, and (ii) a second parameter. In an embodiment, the first parameter corresponds to a plurality of body dimensions of the user. In an embodiment, the second parameter corresponds to plurality of color preferences of the user and an apparel. At step 406, a data independent matrix and a data dependent matrix is derived for at least one of: (i) the first parameter, and (ii) the second parameter. In an embodiment, combined structure of the dependent matrix and the independent matrix of the first parameter is considered to determine a variation of apparel multiple measurements based on at least one of (i) body measurements of the user, (ii) the user profile, (iii) physical activities of the user, (iv) food habits of the user, (v) and an apparel type. In an embodiment, combined structure of the dependent matrix and the independent matrix of the second parameter is considered to determine a variation in behavior of color preferences based on at least one of (i) the user profile, (ii) the apparel type, and (iii) the apparel size. At step 408, the data independent matrix and the data dependent matrix associated with the first parameter, and the data independent matrix and the data dependent matrix associated with the second parameter are learned by a multivariate multi structure model, to obtain a trained multivariate multi structure model. At step 410, a significant pattern associated with each user is determined by extracting a plurality of images from the information associated with the user and the plurality of apparels based on a data reduction techniques. In an embodiment, the significant pattern corresponds to a third parameter. At step 412, the significant pattern associated with each user is deployed on a k-nearest neighbor (k-NN) model to obtain a recommended pattern.

The method further include one or more steps: (a) a plurality of attribute values is estimated by applying (i) the trained multivariate multi structure model, and (ii) the recommended pattern, on a state of the user in a real time; and (b) the plurality of attribute values is mapped with existing apparels in a repository to recommend plurality of prioritized apparels to the user. In an embodiment, the plurality of attribute values corresponds to at least one of: (i) an ideal multiple measurements of an apparel, (ii) an ideal color of an apparel, and (iii) an ideal pattern of an apparel. The method further include one or more steps: (a) a primary relationship is learned between a plurality of missed body measurements and a plurality of available body measurements associated with a set of users by the trained multivariate multi structure model to obtain a specific set of missed body measurements; and an error associated with the specific set of missed body measurements is estimated.

The embodiments of the present disclosure provides approaches to suggest one or more apparel attributes such as an apparel size, a color and a design pattern that are personalized for a customer in a real time. The one or more apparel attribute support to strategize on personalized online assortment and personalized promotion. The embodiments of the present disclosure also provide approaches for apparel size facilitator for a retailer and a manufacturer by simulating body shape by estimating left out measurements that are not provided by customer based on the existing body measurements and other factors that influence body shape. The embodiments of the present disclosure also suggest apparels for customer with high growth rate and customers with changing body shape due to undergoing weight loss or weight gain programs.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of identifying apparel attributes specific to a user by a plurality of estimated attribute values in a digital environment, comprising:

receiving, via one or more hardware processors, information associated with the user and a plurality of apparels;

processing, via the one or more hardware processors, the information associated with the user and the plurality of apparels to obtain at least one of (i) a first parameter, and (ii) a second parameter; wherein the first parameter corresponds to a plurality of dimensions of apparel for the user, and the second parameter corresponds to a plurality of color preferences of the user for the apparel;

deriving, via the one or more hardware processors, a data independent matrix and a data dependent matrix for at least one of: (i) the first parameter, and (ii) the second parameter;

training, via the one or more hardware processors, a multivariate multi structure model, by using (i) the data independent matrix and the data dependent matrix associated with the first parameter, and (ii) the data independent matrix and the data dependent matrix associated with the second parameter to obtain a trained multivariate multi structure model, wherein a combined structure of the data dependent matrix and the data independent matrix of the first parameter is used to determine a variation of apparel multiple measurements based on at least one of (i) body measurements of the user, (ii) a user profile, (iii) physical activities of the user, (iv) food habits of the user, (v) and an apparel type, and a combined structure of the data dependent matrix and the data independent matrix of the second parameter is used to determine a variation in behavior of color preference based on at least one of (i) the user profile, (ii) an apparel type, and (iii) an apparel size, wherein the multivariate multi structure model is trained to learn:

(a) mechanism of 'ease' which varies based on at least one of (i) the user profile, (ii) the apparel type, (iii) fabric of apparel and (iv) weather conditions, and wherein the ease indicates a difference between actual body measurements of the user, and apparel measurements, and (b) a primary relationship between a plurality of body measurements and at least one of age, gender, ethnicity, physical activities and food habits associated with a set of users to estimate body measurements in multiple dimensions for different assumed ages of the user specific to the at least one of gender, ethnicity, physical activity and food habits and to obtain a growth factor for each body part of the user which is used to select an apparel with inclusion of spandex or provision of elastic strips associated with required body parts of the user to associate the selected apparel to the user, performing repeated iterations using the trained multivariate multi structure machine learning model to develop an optimal multivariate multi structure machine learning model, wherein the trained multivariate multi structure machine learning model relates the independent data matrix with the dependent data matrix and maps the body measurements in multiple dimensions, wherein user profiles and factors relate to measurements of the apparel in multiple dimensions, wherein the dependent data matrix and the independent data matrix facilitate capture of an interaction effect occurring between the apparel type and the user profile, wherein the optimal multivariate multi structure machine learning model predicts fitting size parameters comprising measurements of apparel in multiple dimensions based on the user profile;

determining, via the one or more hardware processors, a top pattern of the apparel associated with the user by extracting a plurality of images from the information associated with the user and the plurality of apparels based on data reduction techniques; and deploying, via the one or more hardware processors, the top pattern associated with the user on a k-nearest neighbor (k-NN) model to obtain a recommended pattern, wherein the recommended pattern corresponds to a third parameter;

estimating, via the one or more hardware processors, a plurality of attribute values by applying (i) the optimal multivariate multi structure model, and (ii) the recommended pattern, on a state of the user in a real time, wherein the plurality of attribute values corresponds to at least one of: (i) multiple measurements of the apparel, (ii) a color of the apparel, and (iii) a pattern of the apparel, wherein the trained multivariate multi-structure model predicts suitable measurements of the apparel in multiple dimensions and a color that suits the user; and mapping, via the one or more hardware processors, the plurality of attribute values with existing apparels in a repository to provide a plurality of prioritized apparels to the user.

2. The processor implemented method as claimed in claim 1, wherein the information associated with the user and the plurality of apparels comprises at least one of: (i) historical data related with online purchase and return information, (ii) the user profile, (iii) multiple body measurements of the user, (iv) apparel master data, and (v) weather information.

3. The processor implemented method as claimed in claim 1, further comprising: (a) training, via the one or more hardware processors, the multivariate multi structure model to learn a primary relationship between a plurality of missed body measurements and a plurality of available body measurements associated with a set of users to obtain a specific set of missed body measurements, and (b) estimating, via the one or more hardware processors, an error associated with the specific set of missed body measurements and identifying a proportion of elastic material to be used for a specific part of the apparel.

4. A system (200) for identifying apparel attributes specific to a user by a plurality of estimated attribute values in a digital environment, comprising: a memory (102) storing instructions; one or more communication interfaces (106); and one or more hardware processors (104) coupled to the memory (102) via the one or more communication interfaces (106), wherein the one or more hardware processors (104) are configured by the instructions to:

receive information associated with the user and a plurality of apparels;

process the information associated with the user and the plurality of apparels to obtain at least one of: (i) a first parameter, and (ii) a second parameter, wherein the first parameter corresponds to a plurality of dimensions of apparel for the user, and the second parameter corresponds to plurality of color preferences of the user for the apparel;

derive a data independent matrix and a data dependent matrix for at least one of: (i) the first parameter, and (ii) the second parameter;

train a multivariate multi structure model, by using (i) the data independent matrix and the data dependent matrix associated with the first parameter, and (ii) the data independent matrix and the data dependent matrix associated with the second parameter to obtain a trained multivariate multi structure model, wherein a combined structure of the data dependent matrix and the data independent matrix of the first parameter is used to determine a variation of apparel multiple measurements based on at least one of (i) body measurements of the user, (ii) a user profile, (iii) physical activities of the user, (iv) food habits of the user, (v) and an apparel type, and a combined structure of the dependent matrix and the independent matrix of the second parameter is used to determine a variation in behavior of color preference based on at least one of (i) the user profile, (ii) the apparel type, and (iii) an apparel size, wherein the multivariate multi structure model is trained to learn:
(a) mechanism of 'ease' which varies based on at least one of (i) the user profile, (ii) the apparel type, (iii) fabric of apparel and (iv) weather conditions, and wherein the ease indicates a difference between actual body measurements of the user, and apparel measurements, and
(b) a primary relationship between a plurality of body measurements and at least one of age, gender, ethnicity, physical activities and food habits associated with a set of users to estimate body measurements in multiple dimensions for different assumed ages of the user specific to the at least one of gender, ethnicity, physical activity and food habits and to obtain a growth factor for each body part of the user which is used to select an apparel with inclusion of spandex or provision of elastic strips associated with required body parts of the user to associate the selected apparel to the user,
performing repeated iterations using the trained multivariate multi structure machine learning model to develop an optimal multivariate multi structure machine learning model, wherein the trained multivariate multi structure machine learning model relates the independent data matrix with the dependent data matrix and maps the body measurements in multiple dimensions, wherein user profiles and factors relate to measurements of the apparel in multiple dimensions, wherein the dependent data matrix and the independent data matrix facilitates capture of an interaction effect occurring between the apparel type and the user profile, wherein the optimal multivariate multi structure machine learning model predicts fitting size parameters comprising measurements of apparel in multiple dimensions based on the user profile;
determine, via the one or more hardware processors, a top pattern of the apparel associated with the user by extracting a plurality of images from the information associated with the user and the plurality of apparels based on data reduction techniques; and
deploy, the top pattern associated with the user on a k-nearest neighbor (k-NN) model to obtain a recommended pattern, wherein the recommended pattern corresponds to a third parameter;
estimate a plurality of attribute values by applying (i) the optimal multivariate multi structure model, and (ii) the recommended pattern, on a state of the user in a real time, wherein the plurality of attribute values corresponds to at least one of: (i) multiple measurements of the apparel, (ii) a color of the apparel, and (iii) a pattern of the apparel, wherein the trained multivariate multi-structure model predicts suitable measurements of apparel in multiple dimensions and a color that suits the user; and
map the plurality of attribute values with existing apparels in a repository to provide a plurality of prioritized apparels to the user.

5. The system (200) as claimed in claim 4, wherein the information associated with the user and the plurality of apparels comprises at least one of: (i) historical data related with online purchase and return information, (ii) the user profile, (iii) multiple body measurements of the user, (iv) apparel master data, and (v) weather information.

6. The system (200) as claimed in claim 4, wherein the one or more hardware processors (104) are further configured by the instructions to: (a) train the multivariate multi structure model to learn a primary relationship between a plurality of missed body measurements and a plurality of available body measurements associated with a set of users to obtain a specific set of missed body measurements, and (b) estimate an error associated with the specific set of missed body measurement and identifying a proportion of elastic material to be used for a specific part of the apparel.

7. One or more non-transitory machine-readable information storage mediums comprising one or more instructions, which when executed by one or more hardware processors cause:
receiving information associated with a user and a plurality of apparels;
processing the information associated with the user and the plurality of apparels to obtain at least one of: (i) a first parameter, and (ii) a second parameter, wherein the first parameter corresponds to a plurality of dimensions of apparel for the user and the second parameter corresponds to plurality of color preferences of the user for the apparel;
deriving a data independent matrix and a data dependent matrix for at least one of: (i) the first parameter, and (ii) the second parameter;
training a multivariate multi structure model, by using (i) the data independent matrix and the data dependent matrix associated with the first parameter, and (ii) the data independent matrix and the data dependent matrix associated with the second parameter to obtain a trained multivariate multi structure model, wherein a combined structure of the data dependent matrix and the data independent matrix of the first parameter is used to determine a variation of apparel multiple measurements based on at least one of (i) body measurements of the user, (ii) a user profile, (iii) physical activities of the user, (iv) food habits of the user, (v) and an apparel type and a combined structure of the dependent matrix and the independent matrix of the second parameter is used to determine a variation in behavior of color preference based on at least one of (i) the user profile, (ii) the apparel type, and (iii) an apparel size, wherein the multivariate multi structure model is trained to learn:
(a) mechanism of 'ease' which varies based on at least one of (i) the user profile, (ii) the apparel type, (iii) fabric of apparel and (iv) weather conditions, and wherein the ease indicates a difference between actual body measurements of the user, and apparel measurements, and
(b) a primary relationship between a plurality of body measurements and at least one of age, gender, ethnicity, physical activities and food habits associated with a set of users to estimate body measurements in multiple dimensions for different assumed ages of the user specific to the at least one of gender, ethnicity, physical activity and food habits and to obtain a growth factor for each body part of the user which is used to select an apparel with inclusion of spandex or provision of elastic strips associated with required body parts of the user to associate the selected apparel to the user,
performing repeated iterations using the trained multivariate multi structure machine learning model to develop an optimal multivariate multi structure machine learning model, wherein the trained multivariate multi structure machine learning model relates the independent data matrix with the dependent data matrix and maps the body measurements in multiple dimensions, wherein user profiles and factors relate to measurements of the apparel in multiple dimensions, wherein the dependent data matrix and the independent data matrix facilitates capture of an interaction effect occurring between the apparel type and the user profile, wherein the optimal multivariate multi structure machine learning model predicts fitting size parameters comprising measurements of apparel in multiple dimensions based on the user profile;

determining, via the one or more hardware processors, a top pattern of the apparel associated with the user by extracting a plurality of images from the information associated with the user and the plurality of apparels based on data reduction techniques; and deploying the top pattern associated with the user on a k-nearest neighbor (k-NN) model to obtain a recommended pattern wherein the recommended pattern corresponds to a third parameter;

estimating a plurality of attribute values by applying (i) the optimal multivariate multi structure model, and (ii) the recommended pattern, on a state of the user in a real time, wherein the plurality of attribute values corresponds to at least one of: (i) multiple measurements of the apparel, (ii) a color of the apparel, and (iii) a pattern of an apparel, wherein the trained multivariate multi-structure model predicts suitable measurements of apparel in multiple dimensions and a color that suits the user; and mapping the plurality of attribute values with existing apparels in a repository to provide a plurality of prioritized apparels to the user.

8. The one or more non-transitory machine readable information storage mediums of claim 7, further comprising one or more instructions, which when executed by one or more hardware processors cause: (a) training the multivariate multi structure model to learn a primary relationship between a plurality of missed body measurements and a plurality of available body measurements associated with a set of users to obtain a specific set of missed body measurements, and (b) estimating an error associated with the specific set of missed body measurements and identifying a proportion of elastic material to be used for a specific part of the apparel.

* * * * *